Patented Oct. 17, 1939

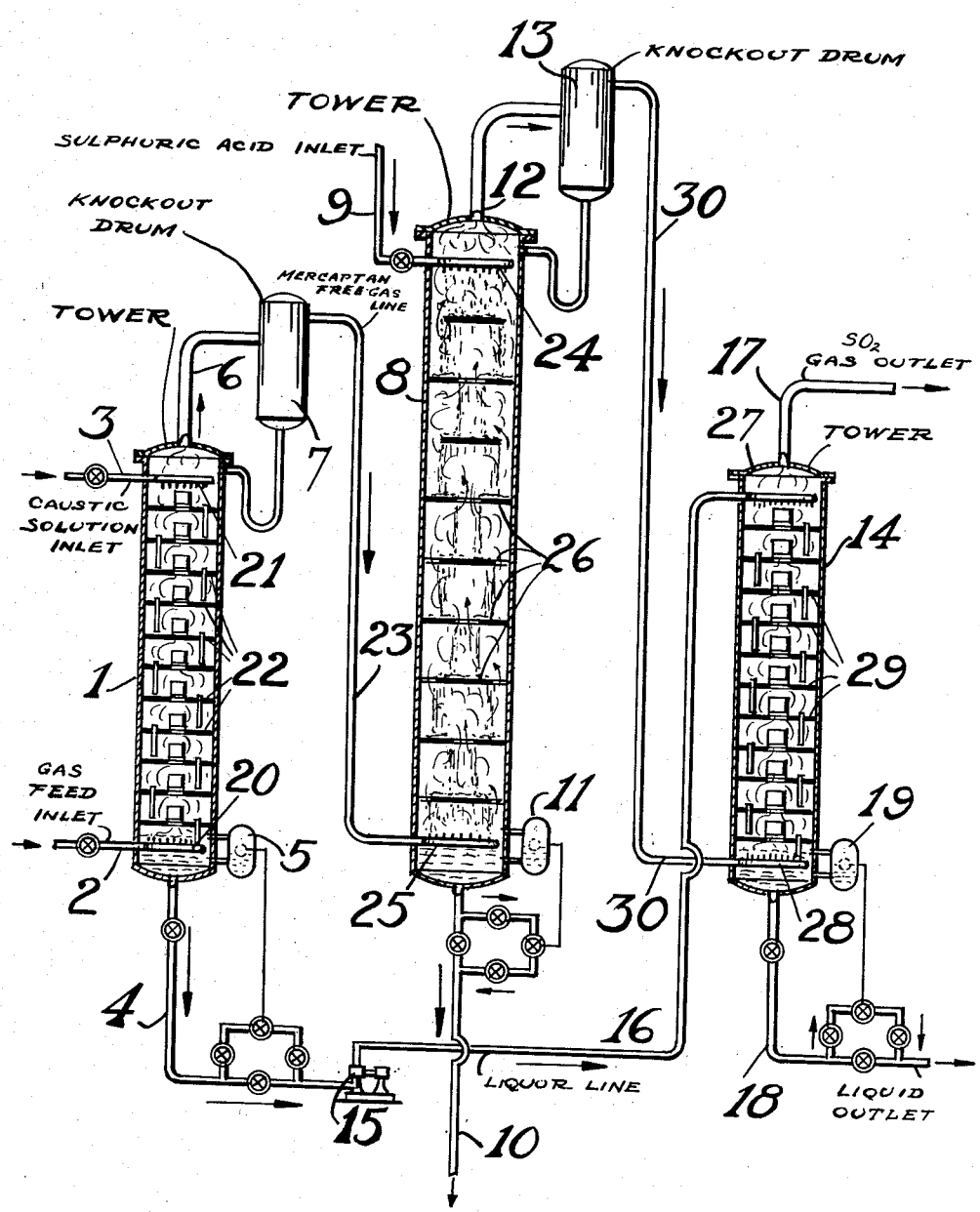

2,176,196

UNITED STATES PATENT OFFICE 2,176,196

DOUBLE USE OF SCRUBBING SOLUTIONS FOR PURIFICATION OF HYDROCARBON GASES

Clayton M. Beamer, Elizabeth, and John Hooton, Linden, N. J., assignors to Standard Alcohol Company Application June 16, 1937, Serial No. 148,464

3 Claims. (Cl. 23—3)

This invention relates to a process involving the purification of gases containing gaseous sulfur compounds. It particularly relates to the removal of various types of gaseous sulfur compounds at respective stages at which the particular type of sulfur compound is harmful in a continuous process. The present invention also relates to the removal of a harmful type of corrosive sulfur compound in a gas and the substitution therefor of another, and further relates to the production of substantially pure alkaline sulfite without the precipitation of free sulfur.

The invention will be more clearly understood by reference to the attached drawing showing one method of carrying out the same.

Inlet gases containing sulfur compounds of the type of hydrogen sulfide and mercaptans and acid reactive hydrocarbons are fed into the bottom of tower 1 by means of feed line 2 and distributed by means of nozzles 20. A caustic solution fed into the top of tower 1 by means of feed line 3 and distributing nozzles 21 flows downwardly through tower 1 intimately contacting the upflowing gases and absorbs substantially all of the mercaptan compounds and hydrogen sulfide. Suitable contacting or distributing plates 22 are employed which may be of the bell or any other suitable design. The caustic solution containing the sulfur compounds is removed from the bottom of tower 1 by means of takeoff line 4.

The mercaptan and hydrogen sulfide free gas is removed from the top of tower 1 by means of takeoff line 6 through knockout drum 7. These gases are then fed into the bottom of tower 8 by means of feed line 23 and flow upwardly through tower 8 intimately contacting counter flowing sulfuric acid which is fed into the top of tower 8 by means of feed line 9. A suitable distributing means as, for example, nozzles 24 and 25, are employed for the liquid and gas respectively. Contacting and distributing plates 26 may be of any desirable design. The sulfuric acid absorbs the acid reactive hydrocarbons and is removed from the bottom of tower 8 by means of takeoff line 10.

The sulfuric acid treated gases substantially free of acid reactive hydrocarbons and containing undesirable sulfur dioxide resulting from the acid treatment are removed from the top of tower 8 by means of takeoff line 12 through knockout drum 13 and are then fed into the bottom of tower 14 by means of line 30. The exit liquor from the bottom of tower 1 fed by means of pump 15 and feed line 16 into the top of tower 14 flows downwardly intimately contacting the upflowing gases. Distributing means such as nozzles 27 and 28 are employed for the incoming liquor and gases respectively. Contacting and distributing means as, for example, plates 29 are also employed. The treated gases containing hydrogen sulfide and mercaptans and free of sulfur dioxide are removed from the top of tower 14 by means of line 17 and the liquid containing the reacted sulfur dioxide in the form of a sulfite is removed from the bottom of tower 14 by means of takeoff line 18.

Liquid levels on towers 1, 8 and 14 may be controlled by the liquid level controllers 5, 11 and 19 respectively.

The present invention is particularly applicable to a process in which olefines are removed from hydrocarbon gases containing hydrogen sulfide and mercaptan compounds by means of sulfuric acid. In this process, it is of extreme importance to completely remove the hydrogen sulfide and mercaptan compounds before removing the olefines by means of the sulfuric acid. If the hydrogen sulfide and mercaptan compounds are not thoroughly removed they react with the reaction product of the sulfuric acid and the olefine thereby decreasing the yields, giving the products disagreeable odors, necessitating purification, thus making the process expensive and involved.

Furthermore, in the process of removing olefines from hydrocarbon gases by means of reacting with sulfuric acid under the conditions of the reaction undesirable sulfur dioxide is evolved and is discharged with the unreacted hydrocarbon gases into the vapor line. As this compound is extremely corrosive, it is necessary that it be entirely removed immediately.

One purpose of the present process is the solution in an economical manner of the difficulties inherent in this operation. The process of this invention removes hydrogen sulfide and mercaptan compounds from the incoming hydrocarbon gas containing acid reactive hydrocarbons by scrubbing said gas with an alkali, preferably by scrubbing with sodium hydroxide. The hydrogen sulfide, mercaptan free gas containing the acid reactive hydrocarbon is removed from the scrubbing tower and treated with sulfuric acid to remove the reactive hydrocarbons in which process undesirable sulfur dioxide is formed and mixed with the unreacted hydrocarbon vapors. This mixture of unreacted hydrocarbons and undesirable sulfur dioxide is removed and scrubbed with the caustic, hydrogen sulfide, mercaptan solution from the initial scrubbing operation under conditions to completely remove the sulfur dioxide from the gases forming as products hydrogen sulfide and mercaptans and a sulfite without the precipitation of free sulfur.

The present process may be used in the acid treatment of any acid reactive gases in which process undesirable sulfur dioxide is evolved, and which gases have been pretreated to remove hydrogen sulfide and mercaptan compounds. It particularly applies to the sulfuric acid treatment of petroleum gases derived from the distilling, cracking and stabilizing of fractions from crude oil sources, for the production of products derived from these gases as, for example, alcohols, ethers, acetates and polymers.

The quantity of caustic solution which is preferably sodium hydroxide used to remove the hydrogen sulfide and mercaptans from the incoming gas is adjusted in quantity and concentration to substantially completely remove these compounds. The concentration of the sodium hydroxide may be adjusted to optimumly remove the hydrogen sulfide and mercaptan compounds under the particular conditions of the scrubbing operation as determined by incoming gas quantity, concentration of the hydrogen sulfide and mercaptan compounds in the incoming gas and scrubbing tower temperature and pressure. The preferred range of concentration at a scrubbing temperature of 20 to 50° C. is from about 1 to 15% concentration in water, preferably at a concentration of about 10%.

The sulfuric acid removal of the reactive hydrocarbons from the hydrogen sulfide mercaptan free gases may be carried out under the conditions of any of the known various operations. The entire fraction of reactive hydrocarbons may be removed or a particular partial selection may be made by adjusting the conditions of the acid tower, acid concentration and the respective quantities of acid to vapors. The removal may be made in one or more stages. The sulfur dioxide containing hydrocarbon gases may be scrubbed with the entire caustic, hydrogen sulfide, mercaptan solution from the initial scrubbing operation or with a portion of it. The conditions are so adjusted that an alkaline condition is maintained throughout the tower, resulting in substantially the complete removal of sulfur dioxide from the gases and the forming of hydrogen sulfide, mercaptans and sodium sulfite without the precipitation of free sulfur. The process, however, may be carried out under conditions whereby the free sulfur is precipitated in the tower when scrubbing out the sulfur dioxide. In this case, the tower design is of such a nature that the sulfur may be readily removed preferably as formed.

The temperatures and pressures of the scrubbing and reaction tower may vary widely within the scope of the present invention. The gases may be subjected to several prescrubbing operations in order to completely remove the hydrogen sulfide and mercaptan compounds. If more than one prescrubbing operation is employed, the first scrubbing operation may be made with an alkaline solution such as sodium hydroxide or may be made with other solutions which will remove hydrogen sulfide and mercaptan compounds, such as mono ethanol amine and diaminopropanol. It is preferred to scrub out substantially all the hydrogen sulfide before removing the last traces of hydrogen sulfide and mercaptan compounds in tower 1. If the same alkali solutions are used in the several prescrubbing operations, the solution from the initial scrubbing operation may be combined with the solution containing the hydrogen sulfide and mercaptan compounds from tower 1 and used to scrub out the sulfur dioxide from the gases from the acid tower. The initial scrubbing operation using alkali solution or mono ethanol amine may completely remove the hydrogen sulfide. The final alkali solution in tower 1 will completely remove the mercaptan compounds from feed gases, probably forming mercaptides. This mercaptide solution may be used as such to completely remove the sulfur dioxide from the exit gases.

The following example is given as one method of the present invention as applied to the flow plan as given on the attached drawing:

Gases secured from petroleum cracking and distilling operations are fractionated and the fraction designated as "stabilizer overhead" has the following analysis:

| | Volume percent |
|---|---|
| Carbon dioxide } | |
| Methane } | 20–40 |
| Ethane } | |
| Propane | 40–45 |
| Propylenes | 20–25 |
| Butane } | 1–3 |
| Butylenes } | |
| Hydrogen sulfide | 4–5 |
| Mercaptans | .05–.10 |

These stabilizer overhead gases are scrubbed at a pressure of 100# per square inch gauge and at a temperature of about 40° C. with a 15 to 20% mono ethanol amine solution which removes substantially all the carbon dioxide and all the hydrogen sulfide. The scrubbed gases containing approximately .05% mercaptans are then scrubbed in tower 1 at a pressure of about 80# per square inch gauge and at a temperature from about 25 to 35° C. with a sodium hydroxide solution at about 10% concentration in water. The mercaptans probably react to form mercaptides and if hydrogen sulfide is present, it probably reacts to form sulfides. These feed gases flow upwardly through tower 1 contacting the downflowing 10% concentration sodium hydroxide solution, which removes substantially all the mercaptan compounds and hydrogen sulfide from the gases. The caustic solution containing the mercaptan compounds and hydrogen sulfide is removed by means of takeoff line 4 and the gases are removed by means of takeoff line 6 through knockout drum 7 and are then fed into tower 8 held at a bottom pressure of about 60 to 70# gauge pressure and at a temperature of about 20° C. These gases flow upwardly through tower 8 intimately contacting sulfuric acid under such conditions to absorb the olefine and in which process undesirable sulfur dioxide is formed. The sulfuric acid concentration is approximately 85 to 94% and higher since it is desired to absorb propylene for the manufacture of isopropyl alcohol. The sulfuric acid containing the acid reactive hydrocarbon compounds is removed from tower 8 by means of takeoff line 10 while treated gases containing sulfur dioxide are removed by means of takeoff line 12 through knockout drum 13 and are fed into tower 14 held at a pressure of about 50 to 60# gauge and a temperature from 20 to 40° C. The sulfur dioxide containing gas flows upwardly through tower 14 intimately contacting the caustic liquor containing the mercaptan compounds or the mercaptan compounds and hydrogen sulfide compounds from tower 1 under such conditions that an alkaline condition exists throughout the tower and that substantially all the sulfur dioxide is removed from the gas and mercaptans and/or hydrogen sulfide substituted therefor. The sulfur dioxide free gas containing hydrogen sulfide and/or mercaptan compounds is removed from tower 14 by means of takeoff line 17 and the liquor containing this absorbed sulfur dioxide is removed from tower 14 by means of takeoff line 18. The sodium sulfite may be recovered from the aqueous solution by any suitable process.

The advantage and utility of the present invention is that in the particular process to which it may be applied the undesirable constituents of a gas will be completely removed with a minimum quantity of one scrubbing solution without the necessity of any intermediate treatment. Furthermore, a maximum yield of sodium sulfite is secured without the formation of any free sulfur which would tend to precipitate and clog up the tower.

It is to be understood that the form of our invention herewith shown and described is to be taken as a preferred example of the same and that various changes may be resorted to without departing from the scope of the invention. The inlet gases and liquids may be fed to the towers to any desired section or to any particular plate. The feed materials may be distributed by adequate means as, for example, with nozzles or artifices connected either in a series or parallel. Temperatures and pressures of the operation may be widely varied and heating or cooling may be employed. The composition and analysis of the feed gases may also vary widely and may consist of substantially all acid reactive hydrocarbons or may contain but a small quantity of acid reactive hydrocarbons.

This invention is not to be limited by any theory of chemical reaction or method of operation but only by the following claims in which it is desired to claim all novelty in so far as the prior art permits.

We claim:

1. Process for the treatment of petroleum hydrocarbon vapors from crude oil sources containing sulfur compounds and used in the manufacture of products involving a hydrocarbon sulfuric acid reaction comprising initially scrubbing said petroleum hydrocarbon vapors containing sulfur compounds with an alkaline solution forming an alkaline sulfur compound solution and a substantially sulfur free petroleum hydrocarbon vapor, then treating said substantially sulfur free petroleum hydrocarbon vapor with sulfuric acid under conditions involving the formation of sulfur dioxide in the unreacted hydrocarbon vapors, then scrubbing said unreacted hydrocarbon vapors containing sulfur dioxide with the alkaline sulfur compound solution from the initial scrubbing operation and completely removing the sulfur dioxide from the unreacted petroleum hydrocarbon vapors and forming hydrogen sulfide and an alkaline sulfur compound solution without the precipitation of free sulfur.

2. Process in accordance with claim 1 in which said alkaline solution is a 1 to 15% concentration sodium hydroxide solution.

3. In the preparation of reactive acid liquors by reacting olefins with sulfuric acid, the following steps which comprise treating an olefine containing gas with an alkaline solution to remove hydrogen sulfide and mercaptans, treating the olefine containing gas with sulfuric acid to remove the olefine and treating the resulting gas with the said alkaline solution containing hydrogen sulfide and mercaptans in solution while maintaining an alkaline condition throughout the last treating step.

CLAYTON M. BEAMER.
JOHN HOOTON.